Sept. 12, 1967     L. I. BENJAMEN     3,340,954
MUFFLER WITH ELASTOMERIC SOUND ABSORBING
LININGS AND BY-PASS VALVE
Filed June 10, 1965

INVENTOR.
Lysle I. Benjamen
BY
Barnard, McGlynn & Reising
ATTORNEYS

United States Patent Office 3,340,954
Patented Sept. 12, 1967

3,340,954
MUFFLER WITH ELASTOMERIC SOUND ABSORB-
ING LININGS AND BY-PASS VALVE
Lysle I. Benjamen, 951 N. Adams,
Birmingham, Mich. 48008
Filed June 10, 1965, Ser. No. 462,874
17 Claims. (Cl. 181—45)

This invention relates to exhaust mufflers, and more particularly to an exhaust muffler for use with an internal combustion engine.

In the design and operation of internal combustion engines, it is desirable to provide an exhaust muffler somewhere in the engine system that conveys exhaust gases from the exhaust manifold to the atmosphere. Such mufflers are used to absorb, damp or otherwise decrease the objectionable sounds created in the exhaust system by the exhaust gases.

Presently available muffling devices are of limited efficiency, and are complicated and cumbersome structures, normally including expansion chambers, resonating chambers, baffles, acoustical coupling devices and other expensive components, arranged in a large housing that is disposed within the exhaust system. Such structures are obviously expensive, both in material costs and in requiring a large number of operations to manufacture and assemble the various parts. In order to provide a desirable level of sound damping, the usual muffler is a large affair that takes up considerable space in the exhaust system. Such devices often cause an increase in exhaust system back pressures, as the engine speed is increased from a minimum to a maximum, the back pressures increasing in a linear or an exponential manner depending on the particular muffler design. At high speeds, such increases in back pressure adversely affect engine horsepower and performance without a comparable increase in noise and vabration muffling or damping.

The device in which this invention is embodied comprises, generally, a simple shell structure forming a housing, and having inlet and outlet conduits extending thereinto in offset relation and terminating within the housing in overlapping relation. The inner walls of the housing are lined with elastomeric rings, and a baffle strip of elastomeric material extends across the housing and between the overlapped portions of the inlet and outlet conduits. Such baffle strip is permitted to flex, or move, with excessive back pressures to increase direct communication between the inlet and outlet conduits and thus compensate for excessive back pressures.

The use of elastomeric rings to line the inner wall of the housing takes advantage of the high hysteresis or vibrational energy absorption ability of elastomeric materials and the resultant highly favorable sound and vibration absorption characteristics. The availability of a wide spectrum of natural resonant frequencies in elastomeric materials allows optimum use to be made of the favorable hysteresis inherent in such materials. By varying the hardness of the rings lining the inner surface of the housing, the sound and vibration frequency absorption range may be varied without adversely affecting the hysteresis of the materials. The use of an elastomeric baffle strip to vary the direct communication between the inlet and outlet conduits permits back pressure control to increase and maintain the efficiency of both the muffler and the engine. The baffle strip may be movable in a transverse plane through the housing to increase or decrease the amount of direct communication between the inlet and outlet conduits, regardless of back pressures, to permit "tuning" of the muffler and thus vary the muffler tone produced rearwardly to the atmosphere.

These and other advantages will become more apparent from the following description and drawing in which.

Figure 1:
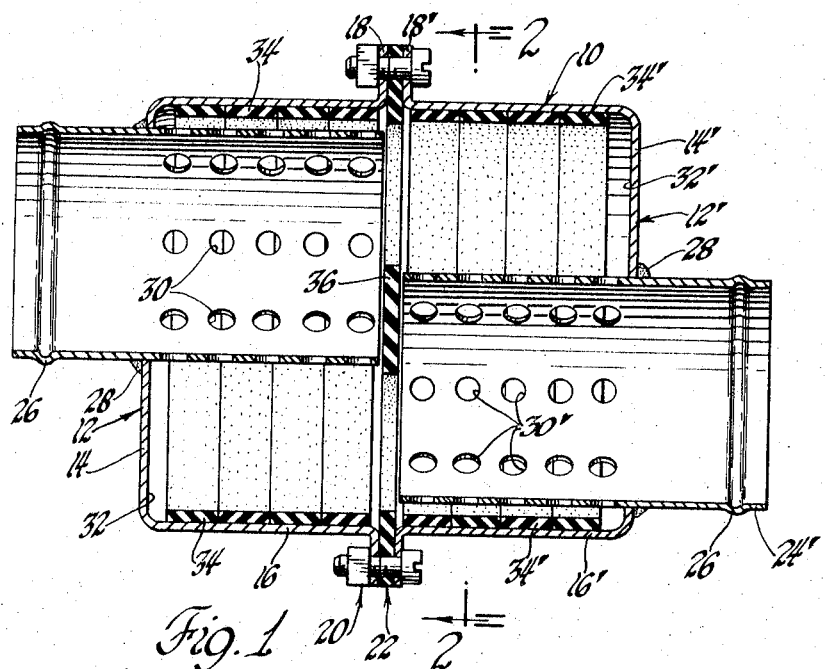
FIGURE 1 is a cross-sectional view of a muffler embodying the invention and illustrating the position of the various parts.

Referring more particularly to the drawing, FIGURE 1 best illustrates the overall muffler construction and position of the various parts. A muffler housing, indicated generally by the numeral 10, is comprised of two identical shells 12 and 12' of generally cup shape, having end walls 14 and 14' and side walls 16 and 16', respectively. Side walls 16 and 16' terminate in annular radially outwardly directed flanges 18 and 18' which may be placed in abutting relation and secured together by suitable fastener assemblies, illustrated generally by the numeral 20. A gasket, illustrated generally by the numeral 22, and which will be hereinafter more particularly described, is disposed between the flanges 18 and 18' and is secured therebetween by the fastener assemblies 20. The gasket 22 serves to seal the housing 10 and prevent leakage of air or exhaust gases to or from the interior of the muffler housing 10.

Figure 2:
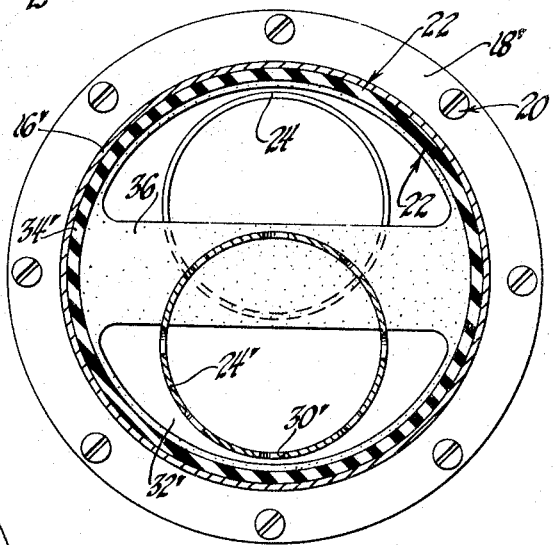
FIGURE 2 is a cross-sectional view of the muffler illustrated in FIGURE 1 taken substantially along the line 2—2 of FIGURE 1 and looking in the direction of the arrows.
Figure 3:
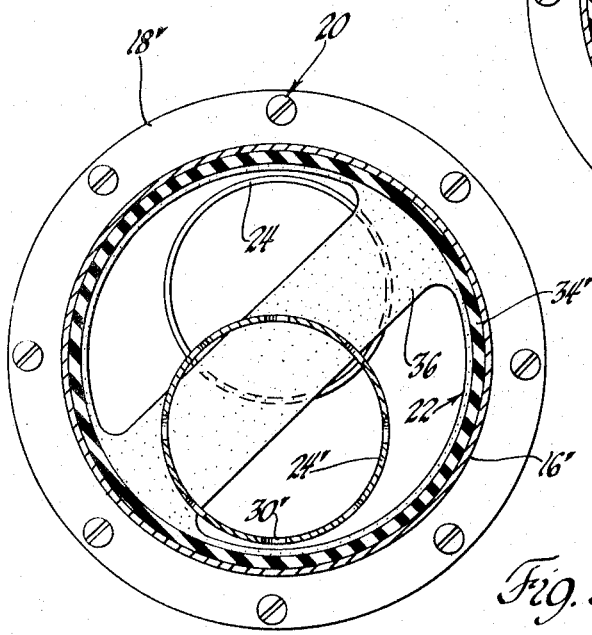
FIGURE 3 is a cross-sectional view of the muffler illustrated in FIGURE 1, showing the baffle strip rotated relative to the inlet and outlet conduits to vary the direct communication therebetween.

Disposed in each end wall 14 and 14' is a conduit 24 and 24', respectively, having centerlines offset from the centerlines of the shells 12 and 12'. The two shells are put together in such manner that the centerlines of the two conduits 24 and 24' will also be offset, as indicated in FIGURE 1. Conduits 24 terminate in close but spaced relation within the housing 10 and are of such diameter as to be in overlapping relation, as illustrated in FIGURES 2 and 3. Conduits 24 and 24' may include annular ridges 26 and 26' to provide convenient means for securing a flexible hose or other conduit structure to the tubes 24 and 24' as desired. Conduits 24 and 24' are secured in the shells 12 and 12' in any suitable manner as by weldments 28.

As will become hereinafter more apparent, the amount of overlap between the inner ends of conduits 24 and 24' can change the characteristics of the muffler structure. The amount of such overlap determines the amount of direct communication between the conduits 24 and 24', thus affecting the back pressure control and tuning in the system. By regular spacing of the bolt holes in the flanges 18 and 18', one of the shells 12 or 12' may be rotated relative to the other upon assembly to provide variations in the overlapping areas. In other words, with the conduits 24 and 24' disposed with their centerlines off-set, but lying in a common diametral plane through the housing 10, a particular area of overlap will be provided. By rotating one shell 12' relative to shell 12 the distance between bolt holes in the flanges 18 and 18', the area of overlap will be increased. Rotating the shell 12' once again the distance between bolt holes will further increase the overlap area. In this manner the overlap area can be varied as desired to provide the best muffler characteristics for the particular installation.

Conduits 24 and 24' are also provided with suitable acoustical coupling means, such as perforations 30 and 30' to provide communication between the conduits and the interior of the housing 10.

Although the shells 12 and 12' and conduits 24 and 24' are identical parts, it will be assumed for purposes of further discussion and illustration that the left hand side of the muffler illustrated in FIGURE 1 is the inlet side, and that the right hand side of the muffler illustrated in FIGURE 1 is the outlet side. Thus, the left hand conduit 24 would be connected to the exhaust manifold of the internal combustion engine with which the muffler is used, and the right hand exhaust conduit 24' would be connected to further exhaust conduits leading to the atmosphere. It is apparent that with the parts formed in identical fashion that the muffler could be reversed or that the inlet and exhaust conduit in the system could be oppositely mounted.

The housing 10 is divided into two resonating chambers 32 and 32', conduit 24 discharging directly into resonating chamber 32' and conduit 24' communicating directly with the resonating chamber 32. The acoustical coupling means 30 in conduit 24 provide communication between the interior of conduit 24 and resonating chamber 32, and the acoustical coupling means 30' in conduit 24' provide communication between the interior of conduit 24' and the resonating chamber 32'. Thus, the normal flow of exhaust gases through the muffler is as follows: The gases flow in through the conduit 24 and directly into the resonating chamber 32'. At the same time, gases flow through the acoustical coupling means 30 into the resonating chamber 32. From the resonating chamber 32, the gases pass directly through the conduit 24' and from the resonating chamber 32', the gases pass through the acoustical coupling means 30' and into the conduit 24'. As will be hereinafter more particularly described, under certain conditions the exhaust gases may pass directly from the interior of conduit 24 to the interior of conduit 24'.

Lining each of the resonating chambers 32 and 32' are a series of elastomeric rings 34 and 34'. The rings 34 and 34' are snugly fitted into the shells 12 and 12' and the separate rings are of various hardnesses to vary the natural absorptive resonant frequencies of the material and to absorb and damp a wide spectrum of engine exhaust noises and vibration frequencies and their harmonics. The rings 34 and 34' are of suitable elastomeric material, such as neoprene, and are of suitable thicknesses and widths to provide the desirable frequency range of sound absorption. It has been found, for example, that a ring of 40 to 45 durometer, as measured by the Shore A measurement, will absorb a natural frequency of 150 to 168 c.p.s. A ring having a durometer of 45 to 50 will absorb a natural frequency of 182 to 186 c.p.s. Similarly, a ring of durometer 50 to 55 will absorb frequencies of 213 to 216 c.p.s. and a ring of durometer 55 to 60 will absorb frequencies of 304 to 310 c.p.s. Thus, a plurality of rings of the above-noted durometers will be effective in damping sounds and vibrations of frequencies over a range from 150 to 310 cycles per second, and all the harmonics of these frequencies. It will be apparent that rings having other durometers might be used to damp other frequency ranges, depending upon the ranges with which the muffler is used.

Disposed between the spaced and overlapping inner ends of the conduits 24 and 24' is a baffle strip 36 of elastomeric material that extends transversely of the housing 10 and may be conveniently formed integrally with the gasket 22. Strip 36 is of such width that when disposed directly across the housing 10 the strip will cover the overlapped portions of the inlet and outlet conduits 24 and 24' and inhibit direct communication therebetween. This position is illustrated in FIGURE 2 of the drawing. The baffle strip 36 is of sufficient flexibility that when excessive back pressures occur in the conduits 24 and 24' the strip 36 will deflect by stretching and tilting in the direction of the excessive pressure to open direct communication between the two conduits. The amount of deflection or tilting will be proportional to the degree of back pressure in the system.

In order to vary the tone of the muffler or "tune" the muffler, the gasket 22 and baffle strip 36 may be rotated relative to the housing 10, as best illustrated by comparison of FIGURES 2 and 3, to uncover a portion of the overlap of the conduits 24 and 24'. By spacing the fastening holes in the flanges 18 and 18', and the corresponding holes in the gasket 22, in regular fashion so that the gasket may be mounted in any position relative to the flanges 18 and 18', the baffle strip 36 may be so located as to increase or decrease the amount of direct communication between the conduits 24 and 24'. Variation in direct communication between the inlet conduit 24 and the outlet conduit 24' will vary the tone produced by the muffler at the outlet end of the muffler. At the same time, such rotation of the baffle strip 36 provides control over the amount of back pressure necessary to deflect the baffle strip 36 as above-described.

Thus an exhaust muffler is provided which is extremely simple in construction, requiring only a few parts and which may be easily and quickly assembled into a completed muffler structure. The size of the muffler, due to the internal sound absorbing characteristics, may be reduced considerably over presently available muffler systems, thus reducing the cost and space requirements for such muffler. By providing back pressure relief and tuneability, the performance of the engine is improved and the efficiency of both the muffler and the engine are improved.

Numerous changes and modifications will become apparent to those having skill in the art after having had reference to the foregoing description and drawing. However, it is not intended to limit the scope of the invention by the foregoing but by the scope of the appended claims in which:

The embodiments of the invention in which an exclusive property or privilege is claimed are defined as follows:

1. A muffler comprising:
   a housing having resonating chambers;
   an inlet conduit extending into said housing;
   an outlet conduit extending into said housing;
   acoustical coupling means between said inlet conduit and a resonating chamber;
   acoustical coupling means between said outlet conduit and another resonating chamber;
   sound absorbing means in said resonating chambers having varying sound absorption capacities therealong;
   and back pressure relief means in said housing.

2. A muffler comprising:
   a housing;
   inlet and outlet conduits extending into said housing and terminating within said housing in spaced overlapping relation;
   sound absorbing means lining the interior wall of said housing and having varying sound absorbing capacities therealong;
   and a back pressure relief member extending transversely of said housing and between the ends of said conduits, said member at least partially covering the overlapping portions of said conduits to inhibit direct communication therebetween and being movable with excessive back pressure in said conduits to increase the amount of direct communication therebetween.

3. A muffler comprising:
   a housing having resonating chambers therein;
   inlet and outlet conduits extending into said housing and inwardly terminating in spaced overlapping relation, said conduits communicating with said resonating chambers;
   and back pressure relief means in said housing and between the terminal ends of said conduits, said back pressure relief means being movable to open direct communication between said conduits in response to excessive back pressure.

4. A muffler comprising:
   a housing having resonating chambers therein;
   inlet and outlet conduits extending into said housing and inwardly terminating in spaced overlapping relation, said conduits communicating with said resonating chambers;

and a back pressure relief member extending across said housing and between the inward terminal ends of said conduits, said member being movable in response to excessive back pressure to open direct communication between said conduits.

5. A muffler comprising:

a housing having resonating chambers therein;

inlet and outlet conduits extending into said housing and inwardly terminating in spaced overlapping relation, said conduits communicating with said resonating chambers;

and a resilient strip extending across said housing and between the inward terminal ends of said conduits, said strip at least partially closing direct communication between said conduits, and said strip being flexible in response to excessive back pressures in said conduits to increase the amount of direct communication between said conduits.

6. A muffler comprising:

a pair of cup-shaped housing sections, each of said sections having an outwardly directed annular flange extending from the open end thereof, said sections being in abutting relation at said flanges to define a housing;

inlet and outlet conduits extending into said housing and terminating therein in spaced overlapping relation;

an annular gasket member received between the opposed faces of said annular flanges to seal said housing;

and a resilient member formed from said gasket member and extending across said housing between the inward terminal ends of said conduits and at least partially closing direct communication between said conduits, said member being flexible in response to excessive back pressure in said conduits to increase the amount of direct commmunication between said conduits.

7. A muffler comprising:

a housing having spaced end walls and being divided into first and second resonating chambers;

an inlet conduit extending through one end wall and into said first resonating chamber and communicating directly with said second resonating chamber;

accoustical coupling means in said inlet conduit to provide communication with said first resonating chamber;

an outlet conduit extending through the other of said end walls and into said second resonating chamber and communicating directly with said first resonating chamber;

acoustical coupling means in said outlet conduit to provide communication with said second resonating chamber;

and sound absorbing means lining the interior of said resonating chambers and having varying sound absorbing capacity therealong.

8. A muffler comprising:

a housing having spaced end walls and being divided into first and second resonating chambers;

an inlet conduit extending through one end wall and into said first resonating chamber and communicating directly with said second resonating chamber;

acoustical coupling means in said inlet conduit to provide communication with said first resonating chamber;

an outlet conduit extending through the other of said end walls and into said second resonating chamber and communicating directly with said first resonating chamber;

acoustical coupling means in said outlet conduit to provide communication with said second resonating chamber;

and back pressure relief means in said housing and between the inner ends of said inlet conduit and said outlet conduit, said means being movable with excessive back pressure in said conduits to increase direct communication between said inlet conduit and said outlet conduit.

9. A muffler comprising:

a housing having spaced end walls and being divided into first and second resonating chambers;

an inlet conduit extending through one end wall and into said first resonating chamber and communicating directly with said second resonating chamber;

acoustical coupling means in said inlet conduit to provide communication with said first resonating chamber;

an outlet conduit extending through the other of said end walls and into said second resonating chamber and communicating directly with said first resonating chamber;

acoustical coupling means in said outlet conduit to provide communication with said second resonating chamber;

sound absorbing means lining the interior of said resonating chambers and having varying sound absorbing capacity therealong;

and back pressure relief means in said housing and between the inner ends of said inlet conduit and said outlet conduit, said means being movable with excessive back pressure in said conduits to increase direct communication between said inlet conduit and said outlet conduit.

10. The muffler set forth in claim 9 wherein said sound absorbing means includes a plurality of ring members disposed in adjacent relation along said resonating chambers, each of said ring members having different sound absorbing capacities than others of said ring members.

11. The muffler set forth in claim 9 wherein said inlet conduit and said exhaust conduit terminate inwardly in spaced overlapping relation.

12. The muffler set forth in claim 11 wherein said back pressure relief means includes an elastomeric strip extending across said housing and covering at least a part of the overlapping portions of the ends of said conduits, said strip being deflected under excessive back pressure in said conduits.

13. The muffler set forth in claim 12 wherein said elastomeric strip may be rotated in a transverse plane of said housing to vary the amount of direct communication between said conduits for tuning said muffler.

14. A muffler comprising:

first and second cup-shaped housing shells having annular outwardly directed flanges at the open ends thereof, said flanges being secured together so that said shells define a housing;

a conduit extending into each of said shells and terminating inwardly thereof in spaced overlapping relation with each other, said conduits communicating directly with the interior of said housing;

acoustical coupling means in each of said conduits within said housing for communicating with said housing;

a plurality of sound absorbing elastomeric rings lining the interior of each of said shells, said rings having varying sound absorbing capacities to absorb sounds having varying frequencies;

and an annular gasket disposed between said flanges on said shells to seal said housing, said gasket having a strip extending diametrically thereacross within said housing and between the ends of said conduits to at least partially block direct communication between said conduits, said strip being flexible to increase direct communication between said conduits when excessive back pressure exists in said conduits.

15. The muffler set forth in claim 14 wherein said gasket is rotatable relative to said flanges to change the position of said strip relative to the ends of said conduits to vary the amount of direct communication therebetween.

16. In a muffler having a resonating chamber and inlet and outlet conduits:
an elastomeric lining around the inner surface of said chamber, said lining having discrete portions of different frequency absorbing capacities along the length thereof.

17. The muffler set forth in claim 16 wherein said discrete portions are adjacently disposed and separate rings of substantially the same axial length, each of said rings having different frequency absorbing capacities.

References Cited

UNITED STATES PATENTS

| | | | |
|---|---|---|---|
| Re. 22,283 | 3/1943 | Bourne | 181—48 |
| 810,542 | 1/1906 | Kahlenberg | 181—45 |
| 2,185,023 | 12/1939 | Crane. | |
| 2,233,804 | 3/1941 | Bourne | 181—50 |
| 2,382,159 | 8/1945 | Klemm | 181—64.1 |
| 2,933,148 | 4/1960 | Hendry | 181—47.1 |
| 2,989,136 | 6/1961 | Wohlberg | 181—42 XR |
| 3,112,007 | 11/1963 | Ludlow et al. | 181—59 |
| 3,187,837 | 6/1965 | Beeching | 181—47.1 |
| 3,209,857 | 10/1965 | Eckel | 181—47.1 |
| 3,263,771 | 8/1966 | Seifert | 181—42 |

FOREIGN PATENTS

| | | |
|---|---|---|
| 49,204 | 9/1938 | France. |
| 1,226,438 | 2/1960 | France. |
| 26,552 | 1905 | Great Britain. |
| 916,836 | 1/1963 | Great Britain. |

RICHARD B. WILKINSON, *Primary Examiner.*

R. S. WARD, *Assistant Examiner.*